United States Patent
Cricri et al.

(10) Patent No.: US 10,521,940 B2
(45) Date of Patent: Dec. 31, 2019

(54) AVATAR-ENFORCED SPATIAL BOUNDARY CONDITION

(71) Applicant: Nokia Technologies Oy, Espoo (FI)

(72) Inventors: Francesco Cricri, Tampere (FI); Jukka Saarinen, Nokia (FI)

(73) Assignee: Nokia Tecnologies Oy, Espoo (FI)

( * ) Notice: Subject to any disclaimer, the term of this patent is extended or adjusted under 35 U.S.C. 154(b) by 0 days.

(21) Appl. No.: 15/452,154

(22) Filed: Mar. 7, 2017

(65) Prior Publication Data
US 2017/0263032 A1    Sep. 14, 2017

(30) Foreign Application Priority Data

Mar. 10, 2016 (EP) .................................. 16159581

(51) Int. Cl.
| | |
|---|---|
| *G06T 11/60* | (2006.01) |
| *A01K 15/02* | (2006.01) |
| *G02B 27/00* | (2006.01) |
| *G02B 27/01* | (2006.01) |
| *H04W 4/02* | (2018.01) |
| *H04W 84/12* | (2009.01) |

(52) U.S. Cl.
CPC ............ *G06T 11/60* (2013.01); *A01K 15/023* (2013.01); *G02B 27/0093* (2013.01); *G02B 27/017* (2013.01); *H04W 4/023* (2013.01); *G02B 2027/014* (2013.01); *G02B 2027/0141* (2013.01); *G02B 2027/0178* (2013.01); *H04M 2250/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0154929 A1 | 8/2003 | Groh et al. | |
| 2008/0055154 A1* | 3/2008 | Martucci | G01S 5/0027 342/357.55 |
| 2009/0134982 A1* | 5/2009 | Robertson | G08B 27/005 340/326 |
| 2011/0242134 A1* | 10/2011 | Miller | G06T 19/006 345/633 |
| 2014/0020635 A1 | 1/2014 | Sayers et al. | |
| 2014/0168397 A1* | 6/2014 | Greco | H04N 7/181 348/77 |
| 2015/0085171 A1* | 3/2015 | Kim | H04N 13/344 348/333.04 |
| 2015/0281887 A1 | 10/2015 | Johnson et al. | |
| 2016/0021500 A1 | 1/2016 | Won | |
| 2016/0075332 A1* | 3/2016 | Edo-Ros | B60W 30/0956 701/70 |

(Continued)

OTHER PUBLICATIONS

Harris, "Did the Digital Dogsitter Ease My Pup's Separation Anxiety?", Mar. 13, 2015.*

(Continued)

*Primary Examiner* — Yi Wang
(74) *Attorney, Agent, or Firm* — Harrington & Smith

(57) ABSTRACT

A method, apparatus, and computer product for: determining that the location of a user satisfies at least one spatial boundary condition; and in response to said determination, causing the presentation of an avatar to the user, wherein the presentation of the avatar comprises presenting an instruction given by the avatar to the user.

20 Claims, 6 Drawing Sheets

(56) References Cited

U.S. PATENT DOCUMENTS

2016/0240007 A1\* 8/2016 Weerasinghe .......... G06T 11/60

OTHER PUBLICATIONS

"Train Your Dog to Stay Home Alone", Digital Dogsitter, Retrieved on Feb. 23, 2017, Webpage available at : https://www.digitaldogsitter.com/.

"Doggles Get Out and Play" Doggles get out and play, Retrieved on Mar. 2, 2017, Webpage available at : http://shop.doggles.com/.

"Announcing Virtual Reality for Dogs", Vimeo, Retrieved on Mar. 2, 2017, Webpage available at : https://vimeo.com/123728069.

"Google Glass for Dogs", Youtube, Retrieved on Mar. 2, 2017, Webpage available at : https://www.youtube.com/watch?v=Oz8BugUnHFY.

Extended European Search Report received for corresponding European Patent Application No. 16159581.4, dated May 9, 2016, 7 pages.

\* cited by examiner

US 10,521,940 B2

AVATAR-ENFORCED SPATIAL BOUNDARY CONDITION

TECHNICAL FIELD

This application relates generally to the presentation of an avatar and an instruction given by the avatar to a user when the user's location is determined to satisfy at least one spatial boundary condition.

BACKGROUND

In recent years it has become more common for animals to be left in the home environment unsupervised as employment equality and the demands of modern living mean that fewer households are occupied during working hours.

Left alone, animals frequently cause damage to their environment through boredom, lack of training or natural exuberance. This is typically not desirable in an environment such as a home.

SUMMARY

According to a first example there is provided a method comprising: determining that the location of a user satisfies at least one spatial boundary condition; and in response to said determination, causing the presentation of an avatar to the user, wherein the presentation of the avatar comprises presenting an instruction given by the avatar to the user.

According to a second example there is provided apparatus comprising means for: determining that the location of a user satisfies at least one spatial boundary condition; and in response to said determination, causing the presentation of an avatar to the user, wherein the presentation of the avatar comprises presenting an instruction given by the avatar to the user.

According to a third example there is provided a computer-readable medium having stored thereon instructions for: determining that the location of a user satisfies at least one spatial boundary condition; and in response to said determination, causing the presentation of an avatar to the user, wherein the presentation of the avatar comprises presenting an instruction given by the avatar to the user According to a fourth example there is provided an apparatus comprising: a processor; and memory including computer program code, the memory and the computer program code configured to, working with the processor, cause the apparatus to perform at least the following: determine that the location of a user satisfies at least one spatial boundary condition; and in response to said determination, cause the presentation of an avatar to the user, wherein the presentation of the avatar comprises presenting an instruction given by the avatar to the user

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Examples and their potential advantages may be understood by reference to the drawings.

Figure 1:
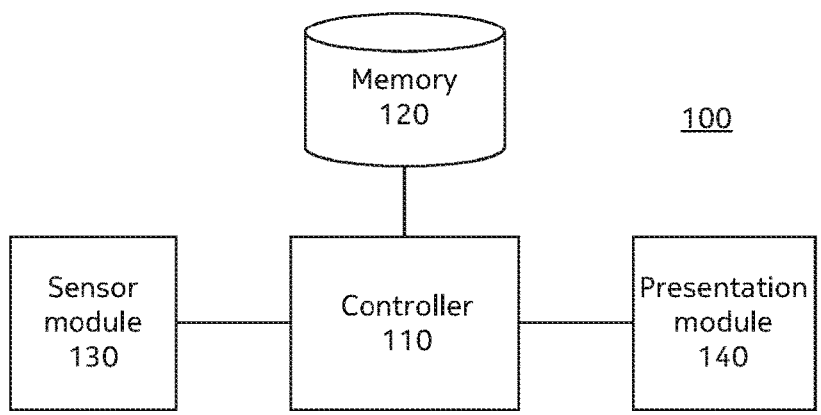
FIG. 1 is an illustration of an example apparatus.

FIG. 1 illustrates an example of apparatus 100 according to an example embodiment of the invention. The apparatus 100 comprises a controller 110 that is connected to each of a memory 120, a sensor module 130 and a presentation module 140. The apparatus 100 may be a wearable device such as a pair of goggles, a pair of glasses, a monocular device, or any other form factor that can be worn by a user. The apparatus 100 may have a form factor that is configured to be worn by a human or an animal, for example a domestic pet such as a dog or a cat, for example by being dimensioned to be securely fitted to the head of the animal.

The controller 110 may be configured to execute computer-readable instructions stored in the memory 120. The controller 110 and memory 120 may be integrated as a single component or may be separate as shown in FIG. 1. It may also be the case that the memory is not present, for example if the controller is hardwired to perform control steps without reference to external instructions, for example if the controller is a suitably programmed Field Programmable Gate Array.

A sensor module 130 may provide to a controller 110 data that permits the controller to establish the location of the apparatus and/or a user of the apparatus. For example, a sensor module 130 may comprise a Global Positioning System (GPS) receiver and provide GPS coordinates to the controller. A sensor module 130 may comprise an indoor positioning sensor using any suitable indoor positioning technology. For example, suitable indoor positioning sensors may use indoor positioning technologies such as magnetic positioning, inertial measurement, WiFi-based positioning systems, Bluetooth beacons or infra-red beacons. The established location may be an absolute location indicating the position of the apparatus 100 and/or its user in a known space (e.g. using GPS coordinates), or it may be a relative position indicating the position of the apparatus 100 and/or its user relative to one or more other objects whose locations may be static, moving, movable, fixed, known or unknown. For example, the location of the apparatus 100 and/or its user may be determined as being a certain range from a particular object, even though the absolute location of that object (e.g. its position on Earth or within a room) is not in fact known.

In some examples a sensor module 130 may be a camera. Although the term "camera" is referred to in this description in the singular, it is intended that it may also encompass arrays of two or more cameras that are used in place of a single camera to permit e.g. depth perception and/or a greater field of view. A "camera" may therefore comprise more than one individual camera device.

A camera may be used as a location sensor in many different ways. For example, when the camera view is within a known environment the location of the camera within that environment can be deduced from the position of known landmarks in the environment within the camera view. Such landmarks may be objects and surfaces that reflect or emit visible light (for example walls, floors, items of furniture, plants, lamps, ceiling and other lights, etc.) and/or objects that reflect or emit light outside the visible spectrum, for example infrared beacons or reflectors.

When an object is visible within the camera's view then the camera's location relative to that object can be determined. For example, the position of the object within the camera's field of view may be used to determine the direction of the camera relative to the object, and the size of the object in the camera's view may be used to determine the distance of the camera from the object. If the camera in fact comprises two or more cameras or suitably adapted optics then the distance of the camera from the object may be determined based on a parallax of the object in the camera's view. Location data may be determined from a camera data in any other suitable manner, and the camera data may be evaluated with other sensor data (e.g. sonar or other proximity data) to provide additional detail and/or accuracy when determining location.

Many different forms of presentation module 140 may be suitable for inclusion in the apparatus 100. The presentation module 140 provides for presentation to a user either be directly outputting a presentation that is detectable by the user, or by causing another device to output a presentation that the user can detect. For example, the presentation module 140 may comprise at least one of a visual display, one or more audio speakers, a haptic output device such as a vibrating module, and/or even output devices that stimulate the sense of smell and/or taste of the user. The presentation module 140 may not comprise the means for actually performing the presentation but may instead comprise means for otherwise causing the presentation to be performed—for example an interface to an output device that can be instructed by the presentation module 140 to perform the presentation. For example, the presentation may be performed by a remote display that is controlled by the presentation module 140, which thus causes the presentation.

The presentation module 140 may be an augmented or virtual reality display, in which case the apparatus 100 may comprise or take the form of a head-worn device such as pair of glasses, goggles, a visor, helmet, monocular, or similar. The user may be able to see through the display under normal use, with a presentation superimposed upon his view of the world through the display.

The presentation module 140 may comprise one or more projectors that are configured to project an image that is detectable by the user onto the user's surroundings.

Alternatively, or in addition, the presentation module 140 may comprise one or more audio speakers or other audio output devices such as bone or arterial conduction transducers, for example a pair of speakers worn in or close to the user's ears. The presentation module 140 may permit the user to hear sounds that occur around him, and also sounds generated by or under the control of the presentation module 140.

Other suitable presentation modules 140 are possible also, and may include any means for presenting an alert or other content to the user. For example, vibrations or other haptic output from a presentation module 140 may be felt by the user and interpreted by him to have a particular meaning. The presentation module 140 may affect the user's sense of taste and/or smell, for example by releasing chemicals that are known to have a particular taste and/or smell such that the user will taste and/or smell them. For example, the presentation module may cause a spray, mist or gaseous release of one or more chemicals such that the spray mist, or gas will pass close to or into the user's mouth and/or nose and thereby by detectable by the user.

In other examples apparatus 100 may not be worn or carried by the user but might instead be located remote from the user. For example, the apparatus 100 may be a device that is located in the same room as the user or otherwise in the vicinity of the user, but spaced apart from the user so that the apparatus 100 and the user could be said to have different locations within their shared environment (e.g. a room they are both within). For example, apparatus 100 may be a surveillance camera or similar device within which the user is in the vicinity. The sensor module 130 in such cases would provide data to the controller from which the location of the user can be derived, rather than the location of the apparatus 100. The user's location may still be defined in absolute terms, relative to the apparatus 100, or relative to other objects and/or locations.

Other alternative hardware configurations are possible and it is not intended that the present disclosure should be limited to just the arrangement shown in FIG. 1.

Figure 2:
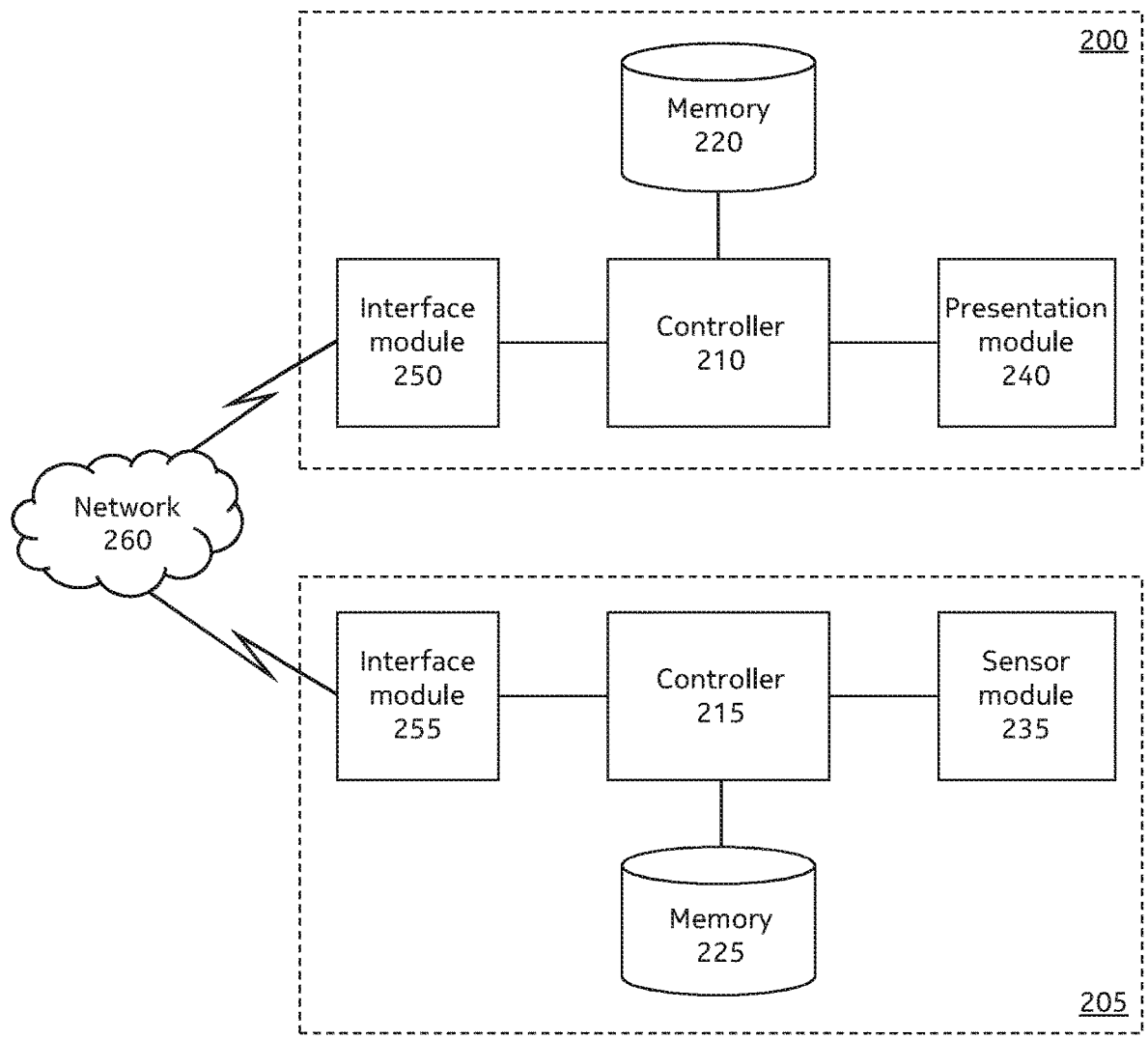
FIG. 2 is an illustration of an example apparatus.

For example, FIG. 2 shows an alternative example of an apparatus that includes a first device 200 that comprises a controller 210, memory 220, and presentation module 240 similar to those described above. The device 200 may be a device that is worn or carried by the user on his/her person. The device 200 does not itself comprise a sensor module, but instead comprises an interface module 250 which is in communication with an interface module 255 of a separate device 205 that does have a sensor module 235. The separate device 205 additionally comprises a controller 215 and a sensor module 235. The interface modules 250, 255 may be directly connected e.g. by a wired or wireless link, or may be indirectly connected via a communications network 260 such as the Internet.

In the example of FIG. 2, the sensor module 235 may take a similar form to that previously described in relation to FIG. 1. However, it is likely that small modifications to the processing of data from the sensor module 235 will be required to account for the fact that the sensor module may not be local to the user. For example, the sensor module 235 may be a camera that is able to see the user and/or device 200 within its field of view, and the location of the user and/or device 200 can then be determined through image analysis of the camera data. That image analysis might be performed by the controller 215 of apparatus 205, by the controller 210 of device 200, or by another entity—for example a server connected to network 260. Regardless of where the processing of the sensor data is performed, ultimately data provided by or derived from the sensor 235 is used to establish the location of device 200 and/or its user.

Figure 3:
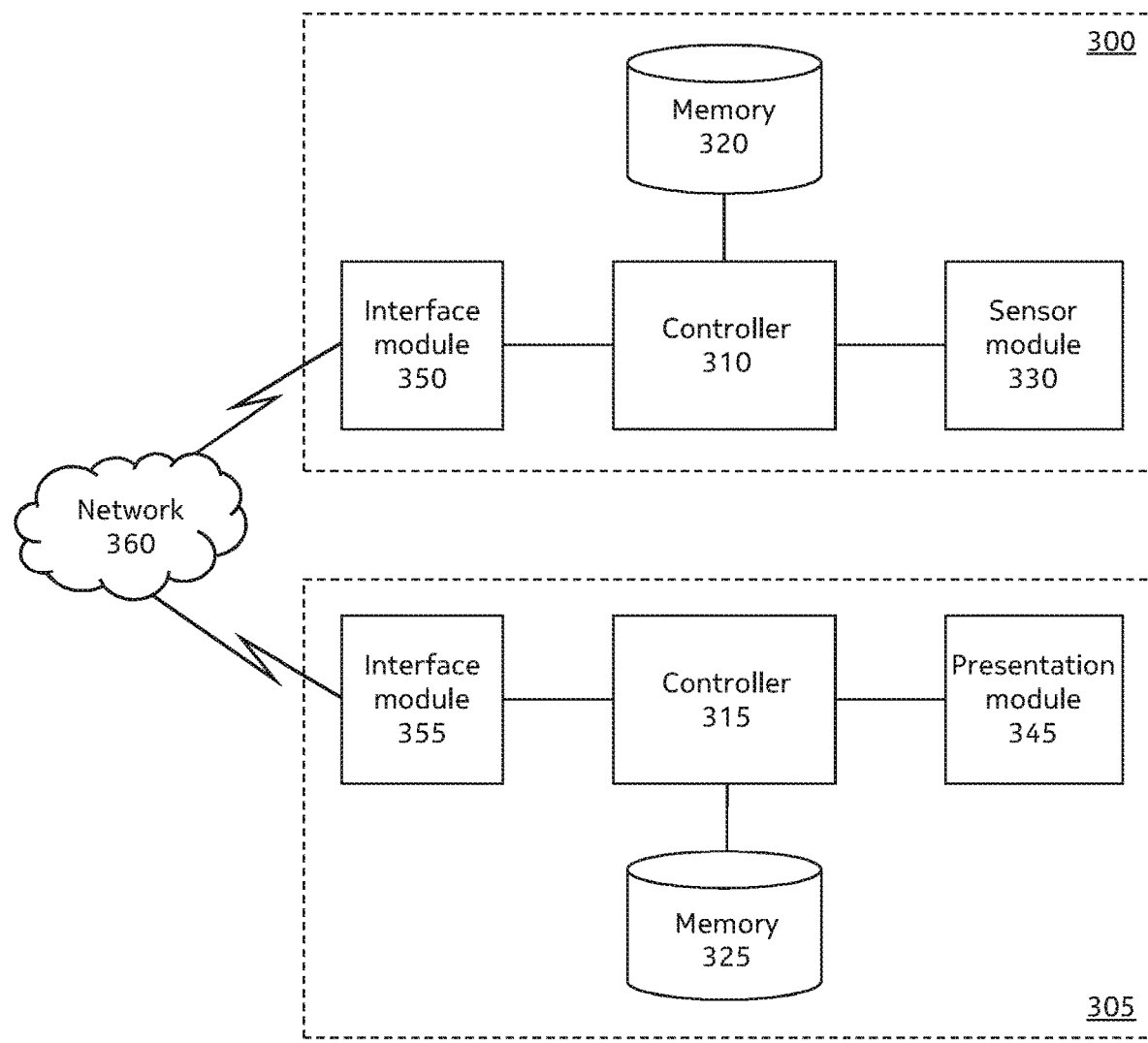
FIG. 3 is an illustration of an example apparatus.

FIG. 3 illustrates another example where the various components described above are divided between multiple devices. Here a device 300 worn or carried by the user comprises a controller 310, memory 320 and sensor module 330, but the presentation module 345 is comprised by a separate device 305, which also comprises a controller 315 and memory 325. Both devices comprise interface modules 350, 355 connected either directly or via a network 360.

In the example of FIG. 3, the user or device 300's location is derived from data collected by the sensor module 330 at device 300, and presentations to the user are made from the presentation module 345 from the separate device 305. In various embodiments data from the sensor module may be processed to determine the location by either controller 310, controller 315, a separate controller (e.g. are accessible over the network 360), or by a combination of any of these.

Other configurations may fall within the scope of the claims, and the above are simply representative of examples.

The connections between the various components may be physical connections, for example via electrical contacts, or other types of connection for example wireless communication via radio, light, or any other suitable channel. All or some of the components described may be integrated into a single element of hardware, for example as an application-specific integrated circuit. The apparatus may comprise a single device housed in a single enclosure (for example a headset). Alternatively the apparatus may comprise separate parts that are spread across multiple devices but connected so that data and/or instructions may be passed between them.

In some examples the user may be a human user. In other example embodiments, the user may not be human but may instead be an animal such as a farm animal, working animal or a domestic animal. For example, the animal may be a horse, a dog, or a cat.

The various apparatuses described may be used to provide instruction to the user when the user's location satisfies certain conditions relative to spatial boundaries. For example, a presentation may be made to the user when the user enters inside a spatial boundary within which the user's presence has been prohibited that instructs the user to exit the area within the spatial boundary.

Figure 4:
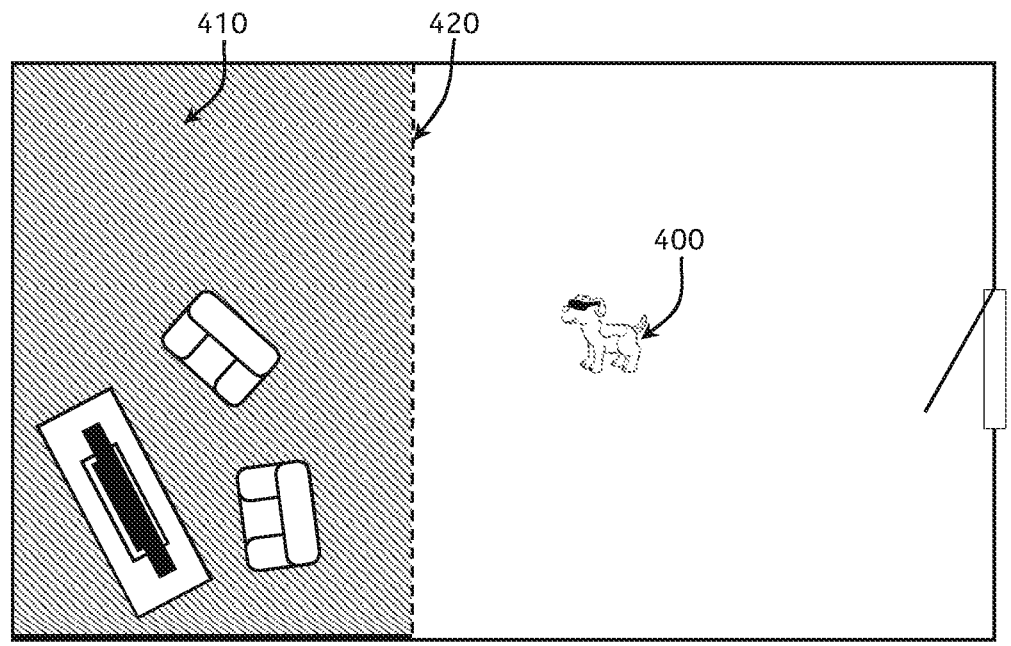
FIG. 4 is an illustration of a room.

For example, FIG. 4 illustrates a dog wearing augmented reality apparatus 100 within a room. The keeper of the dog has defined a spatial boundary condition such that the dog is not allowed to enter or remain in the left-most part of the room 410, shown shaded. The area of the room off-limits to the dog is the area to the left of the spatial boundary line 420. The left-most part of the room contains furniture and electrical equipment that the dog could damage if he is allowed to approach it.

There are many suitable ways for the keeper to define the spatial boundary and the associated spatial boundary condition. For example, the user could indicate the spatial boundary and the spatial boundary condition by indicating them on a plan view or image of the room. The keeper could similarly pace-out the spatial boundary whist carrying the dog's device 100 set to a programming mode in which it learns the location of the intended spatial boundary. The keeper could instead describe a desired result to a computing system and rely on the computing system to determine a suitable spatial boundary and spatial boundary condition (e.g. the user may say "Don't let the dog near my chairs or television" and the computing system may then determine that a spatial boundary that divides the room into two parts and a spatial boundary condition that the dog is not allowed into the leftmost part of the room will achieve this result).

In another example the spatial boundary may be defined through the use of beacons placed in appropriate locations and/or tags affixed to particular objects. The beacons and/or tags may be positionable by an administrator—for example the keeper of an animal. The beacons and/or tags may self-report their location using suitable positioning technologies, or may be detectable by another device (e.g. a sensor module as previously described) so that their location may be determined. The spatial boundary may be defined by the point location of one or more of the tags and/or beacons, for example as a radius around each point location, or may be defined by a line relative to a combination of such beacon and/or tags—for example a line connecting adjacent beacons and/or tags or a line perpendicularly bisecting two beacons/tags. Many alternatives are possible in which beacons and/or tags can be used to define a spatial boundary.

There are many suitable ways for the user to determine the spatial boundary (i.e. the spatial boundary itself) and the spatial boundary condition (one or more rules relating to the spatial boundary).

The spatial boundary itself may take different geometric forms. For example, the spatial boundary may be a line of finite length, the line being either straight or having a different shape. The spatial boundary may be a line of infinite length, and may, for example, be a circumferential line around the earth. The spatial boundary may form an open or closed geometric shape. For example the spatial boundary may form a circle, square, rectangle, triangle, or other regular or irregular shape that encloses an area. In such examples, the spatial boundary condition may relate to the user's presence inside or outside the enclosed area. The spatial boundary may define a geometric shape that is open along at least one portion of its perimeter—for example it may define a square that is open on one side. A spatial boundary that defines an open geometric shape may be useful, for example, where a spatial boundary condition defines that access into and/or out of the area enclosed by the shape is only permitted via a certain route that corresponds to the open portion; for example, the geometric shape may define the perimeter of a swimming pool and the open portion may correspond to the position of steps leading into the shallow end of the pool. A spatial boundary condition only permitting entrance inside the spatial boundary at the location of the steps may be used to prevent a user from inadvertently entering the pool at the deep end where they may be out of their depth.

When the dog 400 breaches the spatial boundary condition by entering the left-most part of the room 410 by crossing the spatial boundary 420 from right to left, the presentation module 130 may be used to instruct him not to. For example, a presentation may be made of an avatar that the dog 400 associates with his keeper.

Figure 5:
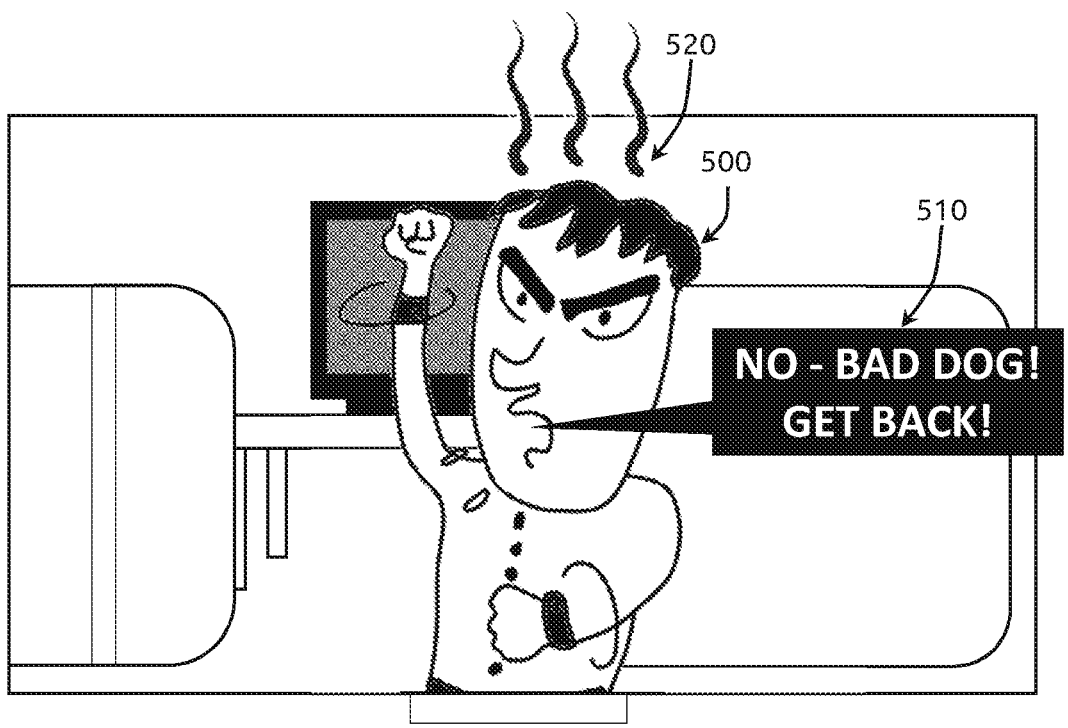
FIG. 5 is an illustration of an example presentation of an avatar.

FIG. 5 shows a representation of one possible presentation to the dog 400. The dog is presented with an avatar associated with the keeper. In this example the dog is wearing an augmented reality display and sees a visual representation 500 of the keeper's avatar. The dog is also wearing an audio speaker which plays 510 to the dog an audio file of the keeper's voice. The dog's experience may be enhanced by the presentation device releasing for example a natural or artificial sample of the keeper's scent 520. Instead of the keeper's scent 520, some other suitable scent could be used alternatively. The dog's experience's the avatar of his keeper instructing him to reverse his breach of the spatial boundary condition—i.e. to leave the forbidden part of the room.

The avatar is not necessarily a visible avatar—for example, the dog 400 may recognise the keeper by voice or smell alone and it may be that an audio and/or olfactory avatar is sufficient. The term "avatar" is used to describe a representation of a real of virtual entity such as a person that can be presented to a user using any appropriate means. The avatar provides an instruction to the user (in this example to the dog) which may again be via any means that can be understood by the user—visual, audial, olfactory, etc.

The presentation of the avatar may continue or repeat whilst the spatial boundary condition remains satisfied. For example, the keeper's avatar may continue to instruct the dog 400 to cross back over the spatial boundary 420 whilst the dog remains in the left part 410 of the room, either being presented to the dog constantly, or through periodic repeated presentations whilst the dog 400 is in the left part 410.

The presentation may be varied whilst the spatial boundary condition is satisfied, or between occasions when the spatial boundary condition is satisfied. For example, the presentation may be intensified with increased duration of satisfaction of the spatial boundary condition, or with successive satisfactions of the spatial boundary condition. A level of intensity may be varied by varying settings associated with the presentation, for example a visual presentation may be made brighter, an audio presentation louder, and a presentation relating to smell and/or taste may be made stronger. The presentation itself may convey a different instruction—for example the initial instruction may be an avatar that calmly instructs the user to "Go back" the first time the spatial boundary condition is satisfied, but if the user does not cease to satisfy the spatial boundary condition, or ceases to satisfy it but then satisfies it again then the avatar may more emphatically instruct the user "GO BACK RIGHT NOW!" with a louder voice and more emphatic tone, facial expressions and gestures. The level of intensity may depend on a frequency with which the spatial boundary condition is satisfied within a certain period of time. For example, it may be made more intense when the spatial boundary condition is satisfied several times in rapid succession and less emphatic if a long period of time has passed since the spatial boundary condition was last satisfied.

The intensification of the presentation may instead or additionally be achieved through changes in the type of presentation. For example, at a lower level of intensity, a presentation may be an audio presentation such as a voice command, with successively higher levels of intensity introducing a visual presentation and then an olfactory and/or taste presentation. An advantage of this may be that the presentation is less distracting or disruptive at lower intensity levels, but more emphatic, noticeable, and persuasive at higher intensity levels. The type of presentation at each intensity level may be selected according to the intended use case and the intended user.

The duration of time or frequency with which a spatial boundary condition is satisfied is an example of a level to which a user satisfies a spatial boundary condition. If the user has satisfied the condition for a short period of time and has done so infrequently then the level of satisfaction of the condition may be deemed to be low. The level may be deemed elevated as the user satisfies the condition more frequently and/or for greater durations. Similarly, the level of satisfaction may be dependent upon the distance that the user passes over a spatial boundary. For example, the dog 400 of FIG. 4 may be deemed to have satisfied the spatial boundary condition to a lesser level when he initially steps over spatial boundary 420 than when he has entered further into the forbidden part of the room 410.

The level to which the spatial boundary condition is satisfied may influence the level of intensity of the presentation of the avatar—for example a higher level of satisfaction may result in a higher level of intensity.

For example, domestic and captive animals will commonly move repeatedly along a particular route within their surroundings either through stereotypy or simply because it is a favoured route and this can cause damage and wear to their environment, e.g. uneven wear in a carpeted room. A spatial boundary condition may be defined to prohibit passage of an animal along a particular route in its surroundings but the presentation of an avatar configured only to be activated when the animal is deemed to be following this route excessively—e.g. when it is deemed to follow the route more than a predetermined number of times during a predetermined time period. Thus the movement of the animal will be unimpeded by the spatial boundary condition unless undesirable behaviour is detected.

Figure 6:
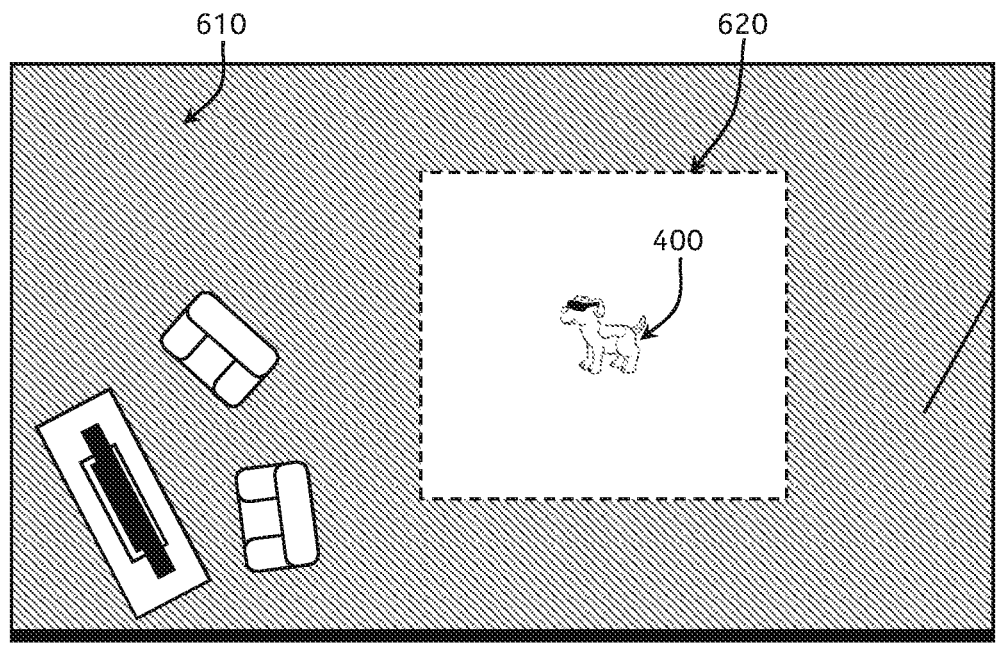
FIG. 6 is an illustration of a room.

FIG. 6 shows an alternative example of a spatial boundary condition in which the dog 400 is permitted to remain within a box 620 defined by its keeper and not permitted elsewhere in the room (shown by the shaded part of the room 610). This spatial boundary condition may be supplemented by additional criteria—for example the spatial boundary condition may only apply during certain times of day, when the animal is left in the room on its own, etc. Similarly, a time limit may be imposed on the spatial boundary condition wherein the spatial boundary condition is only satisfied should the dog 400 leave the box 620 for greater than a predetermined period of time, permitting brief departures from the box 620 without instruction from the avatar.

FIGS. 4 and 6 show examples where the spatial boundary conditions are defined relative to boundaries that have an absolute position within an environment. However, boundaries may also be defined with positions relative to particular objects.

Figure 7:
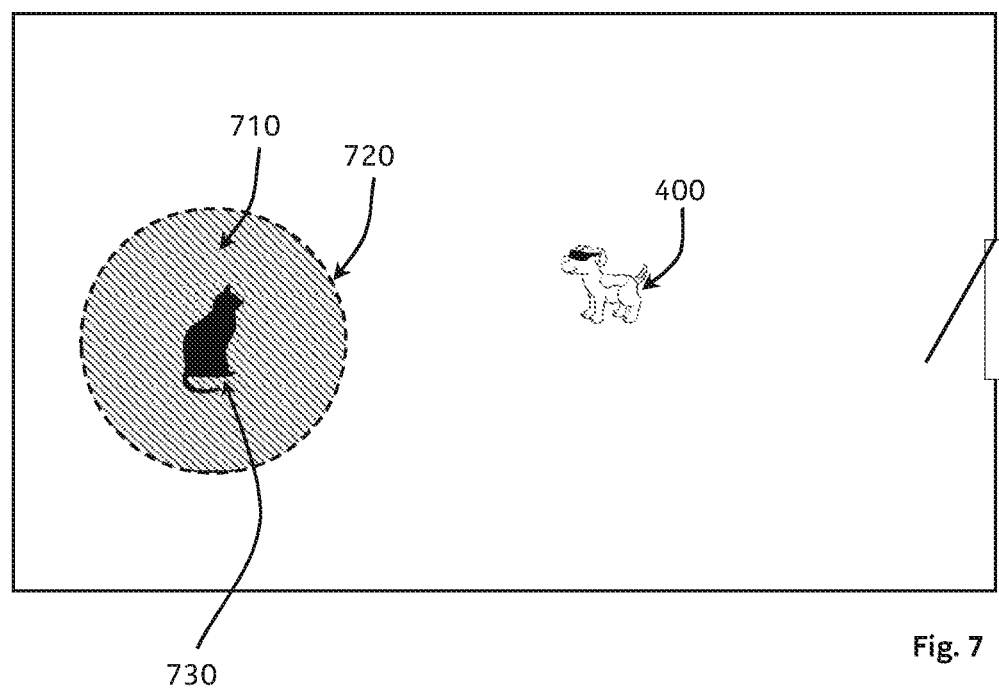
FIG. 7 is an illustration of a room.

FIG. 7 shows an example where a spatial boundary condition has been set where the dog 400 is forbidden from being within a predetermined radius of a cat 730. The cat may be a particular cat, or any cat. Similarly any other specific object or type of object may be chosen as the centre of the forbidden area 710. The location of the cat 730 may be determined by sensors worn by the cat (e.g. a GPS receiver), by the dog 400 or located elsewhere. For example, the location of the cat 730 may be determined based on object detection performed on a video feed, or based on the detection of a beacon worn by the cat 730 and detected by a sensor elsewhere. The location of the cat 730 may be determined based on analysis of camera data from a camera worn by the dog 400.

Although in this example the spatial boundary is defined as a circle around a predetermined object (in this case cat 730), the spatial boundary may be otherwise defined relative to the predetermined object's location. For example, the spatial boundary may take a form of a shape or line other than a circle and may not be centered on the object. For example, the spatial boundary may take the form of a line of infinite length that has a predefined position and orientation relative to the object—e.g. the spatial boundary may be an East-West line that is 1 meter to the North of the predefined object in order that a spatial boundary condition "The user may not be more than one meter north of the object" can be defined.

As the cat 730 moves around the room, the spatial boundary 720 around it and therefore the part 710 of the room that is forbidden to the dog changes. It may not be apparent to the dog 400 where in the room he is permitted to be, but if he is within part 710 then the presentation of the avatar may instruct him to move towards a permitted area.

Figure 8:
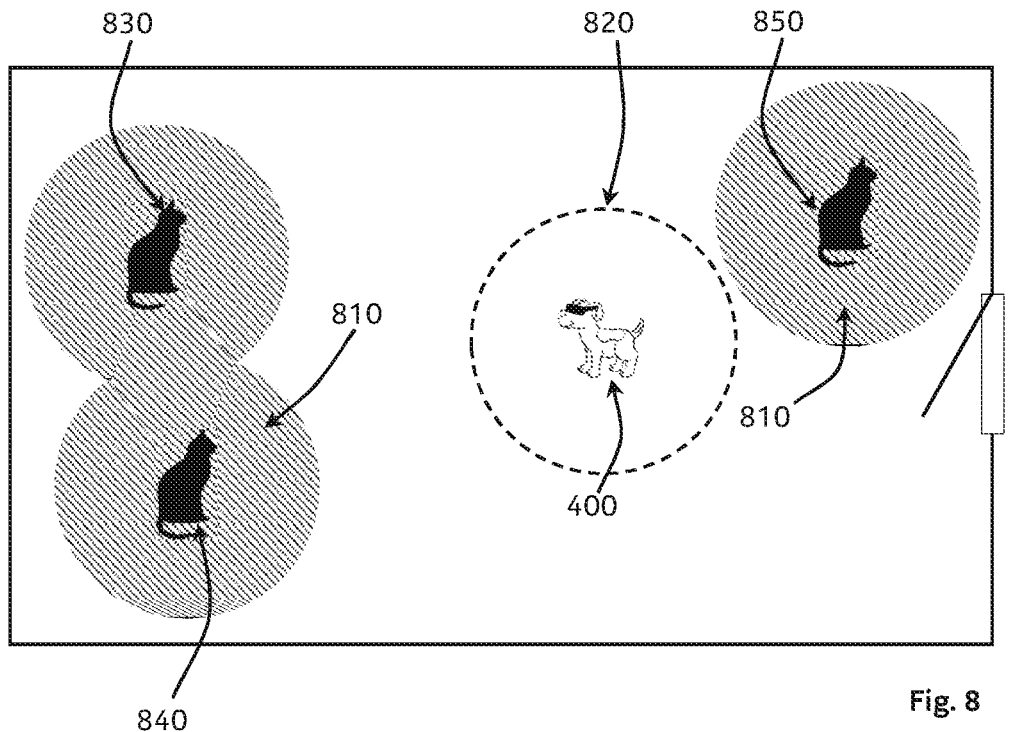
FIG. 8 is an illustration of a room.

FIG. 8 shows an alternative embodiment where the spatial boundary 820 has been defined relative to the user (in this example the dog 400) rather than to other objects. This may simplify the definition of a spatial boundary condition that is intended to prevent the dog from approaching one or more different movable or fixed locations or entering areas otherwise associated with such a location.

Such locations may be defined relative to the location of a predefined fixed or movable object, e.g. they may be the current location of the predefined fixed or movable object.

Alternatively, such locations may not be defined relative to fixed or movable object. For example, a location may be defined as an absolute physical location such as a set of GPS coordinates or a relative location such as a position within a known environment such as room. Locations defined other than relative to objects need not necessarily be static or at fixed locations, and may for example be movable along a predetermined path. For example, the keeper of a goat in a grass field may wish to restrict the goat's movements such that it does not continuously eat the same area of grass but instead spreads its grazing over a wider area of the field. He may define a location in the field that moves over time along a set path, and an accompanying spatial boundary as a circle with a particular radius around that moving location. A spatial boundary condition that the goat may not leave the circle around the moving location may be used to ensure that the goat changes grazing position over time in line with the path defined for the moving location.

In other examples a movable location defined otherwise than in relation to an object may move based on factors other than time. For example, the keeper of a guard dog may define a location within a certain radius of which he wishes the guard dog to remain in order to patrol that area. However, an intrusion detection system may be configured to move the location dependent upon input from intrusions detection sensors such as vibration sensors or passive infrared sensors. For example, when a possible intrusion is detected the initial location defined by the user may be moved towards the area in which the intrusion was detected. If a spatial boundary condition is defined based on this movable location, it provides a degree of remote control through which the guard dog can be dynamically redeployed where it is required.

In FIG. 8 a spatial boundary condition has been defined such that the dog may not be in a position wherein a cat is within a certain predefined distance 820 of the dog. Three cats 830, 840, 850 are present within the room and the area 810 of the room forbidden to the dog therefore has a far more complex shape than the spatial boundary 820 around the dog and may change dynamically as the cats move. The avatar will be presented to the dog whenever he enters the forbidden area 810, of the room—i.e. whenever he and/or a cat moves such that a cat is inside an area defined by the spatial boundary 820 around the dog.

In the examples above, a simple spatial boundary condition has been defined relative to single spatial boundary. However, more complex spatial boundary conditions relative to one or more boundaries are also possible. For example, a spatial boundary condition may be defined such that the dog 400 is forbidden from entering the left half of the room 410 shown in FIG. 4 for more than a particular duration of time, whilst also forbidden from being in a position where a cat is within a predefined distance 820 of the dog. Should that spatial boundary condition be satisfied either by the dog lingering in the left half of the room or because he is too close to a cat, an avatar may be presented to him to instruct him to move to a location that does not satisfy the spatial boundary condition.

The spatial boundary condition may relate to the presence of the user within an area that is defined by a spatial boundary, or it may relate to the crossing of a spatial boundary in one or both directions. For example, the keeper of an animal may wish to prevent the animal from scrambling over a gate in a garden, perhaps because of damage caused to the gate, but may be happy for the animal to be present on either side of the gate. Here the spatial boundary condition may relate to the crossing of a spatial boundary defined by the gate, independent of the direction of the crossing and an avatar may be presented to the animal when the animal crosses the spatial boundary in order to dissuade it from future crossings.

Similarly, the spatial boundary condition may apply to a crossing in only one direction. For example, it may be desirable for a farmer to define a spatial boundary at the entrance to a sheep pen into which he wishes to drive his sheep. The spatial boundary condition would be satisfied only if the spatial boundary was crossed from inside the pen heading outside the pen, in order that the sheep should not be dissuaded from entering the pen but should be instructed by the avatar to return inside the pen if they attempt to cross the spatial boundary from inside.

The spatial boundary condition may be dependent upon previous movement by the user. For example, a user may be permitted to cross a spatial boundary or be present inside or outside a spatial boundary depending upon the nature of his movement prior to that moment in time. In the example of a dog, a particular spatial boundary condition may be satisfied only if the dog is determined to have been behaving excitably beforehand—e.g. a dog may be permitted to approach a delicate piece of furniture if his recent movement has been slow and calm, but if his movement is determined to have been fast and erratic it may be desirable to keep him away from the delicate furniture by causing him to satisfy the spatial boundary condition as he approaches the furniture.

Similarly, the crossing of a spatial boundary or presence within a spatial boundary may or may not satisfy a spatial boundary condition based on the user's direction of movement prior to the crossing—e.g. if the user is determined to be moving generally in a direction that is favoured then a spatial boundary condition that would otherwise be satisfied may not be satisfied. For example, a dog may be permitted to cross spatial boundaries or enter areas defined by spatial boundaries only if it is determined that he is moving in the direction of his bed, and not if he is determined to be moving away from his bed.

Other prior movement of the user may be taken into account in other example use cases. For example, the speed, direction and/or path of the user's movement, and whether or not they have previously approached certain objects (e.g. high value and/or delicate objects).

There are many potential use cases relating to different animal types—for example humans, domestic animals, and farmed animals. Although particular animals and use cases have been referred to above, these are intended as examples.

Figure 9:
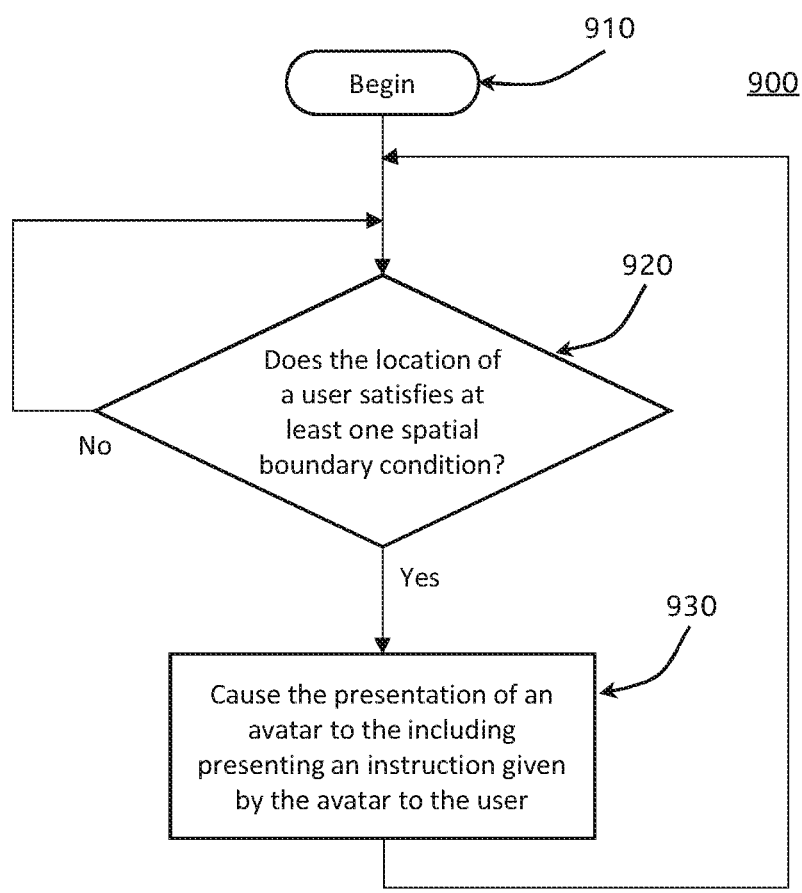
FIG. 9 is a flow chart illustrating an example method.

FIG. 9 shows a flow chart of an example of a method 900. At its beginning 910, the method 900 determines 920 whether the location of a user satisfies at least one spatial boundary condition. If the location does satisfy the at least one spatial boundary condition, the method causes 930 the presentation of an avatar to the user, including presenting an instruction given by the avatar to the user. The method may be repeated continuously or performed just once—the example method 900 shown loops continuously, causing the avatar to be presented whenever the spatial boundary condition is met.

Figure 10:
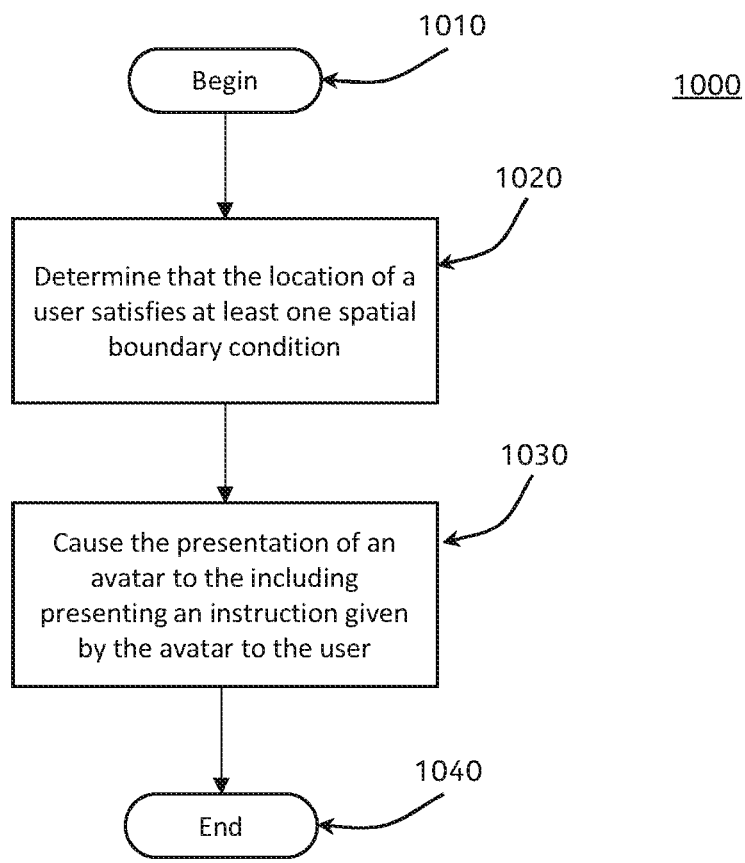
FIG. 10 is a flow chart illustrating an example method.

In FIG. 10, the method 900 of FIG. 9 has been reformulated to show a method 1000 of just one iteration, where the determination is that the location of the user does satisfy the spatial boundary condition. After beginning 1010, the method 1000 determines 1020 that that the location of a user satisfies at least one spatial boundary condition. The method 1000 then causes 1030 the presentation of an avatar to the user, wherein the presentation of the avatar comprises presenting an instruction given by the avatar to the user. The method 1000 then ends 1040.

Without in any way limiting the scope, interpretation, or application of the claims appearing below, a technical effect of one or more of the example embodiments disclosed herein is that recognisable and persuasive instructions can be given to a user to prevent the user from entering areas or remaining in locations that the user is not permitted to enter or remain in. The presentation of an avatar to the user provides an additional imperative to the instructions. For example, a non-human animal may not respond to an instruction that it does not interpret as having been immediately given by its keeper, but may follow instructions when it believes that its keeper is present giving the instruction.

Examples may be implemented in software, hardware, application logic or a combination of software, hardware and application logic. The software, application logic and/or hardware may reside on a removable memory, within internal memory or on a communication server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described elements may be optional or may be combined.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes examples, these descriptions should not be viewed in a limiting sense. Rather, there are several variations and modifications which may be made without departing from the scope of appended claims.

The invention claimed is:

1. A method comprising:
receiving, with a computing device and from a sensor module, first sensor data;
analyzing the first sensor data to determine a first location of an entity;
based on determining that the first location satisfies a spatial boundary, determining a first type for a first augmented reality presentation of an avatar and a first intensity level for the first augmented reality presentation of the avatar;
causing output, based on the first type and the first intensity level, of the first augmented reality presentation of the avatar, wherein the first augmented reality presentation of the avatar indicates, to the entity, an instruction associated with the spatial boundary;
receiving, with the computing device and from the sensor module, second sensor data;
analyzing the second sensor data to determine a second location of the entity;
based on determining that the second location satisfies the spatial boundary and based on a time between the determining that the first location satisfies the spatial boundary and the determining that the second location satisfies the spatial boundary, determining a second type for a second augmented reality presentation of the avatar and a second intensity level for the second augmented reality presentation of the avatar, wherein the first type is different from the second type and the first intensity level is different from the second intensity level; and
causing output, based on the second type and the second intensity level, of the second augmented reality presentation of the avatar.

2. The method of claim 1 wherein the first type or the second type comprises at least one of a visual presentation, an auditory presentation, an olfactory presentation, or a taste presentation.

3. The method of claim 1 wherein the instruction indicates that the entity is to move to a location where the spatial boundary is not satisfied.

4. The method of claim 1 wherein the first intensity level is based at least in part upon a level to which the first location satisfies the spatial boundary.

5. The method of claim 1 wherein the entity is a non-human animal, wherein the avatar comprises a representation of a keeper of the non-human animal;
wherein the first augmented reality presentation of the avatar is output to a pair of goggles the non-human animal wears for display with the pair of goggles; and
wherein the second augmented reality presentation of the avatar is output to the pair of goggles for display with the pair of goggles.

6. The method of claim 1 wherein the spatial boundary indicates a first area with locations allowable to the entity and a second area with locations not allowable to the entity;
wherein determining that the first location satisfies the spatial boundary is performed based on the first location indicating that the entity is outside the first area, the first location indicating that the entity is inside the second area, or the first location indicating that the entity is crossing from the first area to the second area in at least one direction; and
wherein determining that the second location satisfies the spatial boundary is performed based on the second location indicating that the entity is outside first area, the second location indicating that the entity is inside the second area, or the second location indicating that the entity is crossing from the first area to the second area.

7. The method of claim 6 wherein the first augmented reality presentation indicates that the entity is not allowed in the second area, wherein the second augmented reality presentation indicates that the entity is not allowed in the second area, and wherein the method further comprises:
determining, with the computing device, whether previous movement of the entity corresponds to a type of movement that allows the entity to move to a location of the second area; and
determining to allow the entity to move to the location of the second area when the previous movement of the entity corresponds to the type of movement.

8. The method of claim 1 wherein the spatial boundary is defined based on a predetermined distance from at least one fixed location or at least one movable location.

9. The method of claim 8 wherein the at least one fixed location or the at least one movable location is defined with a location of an object different from the entity, and wherein the method further comprises:

configuring, with the computing device, the spatial boundary based on an audible command from a user different from the entity, wherein the audible command indicates the object.

10. The method of claim 1, wherein the first augmented reality presentation of the avatar indicates, to the entity, the instruction based on one or more first visually displayed gestures of the avatar and a first audible voice of the avatar, wherein the one or more first visually displayed gestures and the first audible voice of the avatar are based on the first intensity level; and
wherein the second augmented reality presentation of the avatar indicates, to the entity, the instruction based on one or more second visually displayed gestures of the avatar and a second audible voice of the avatar, wherein the one or more second visually displayed gestures and the second audible voice of the avatar are based on the second intensity level, and wherein the second intensity level is greater than the first intensity level.

11. An apparatus comprising:
at least one processor; and
at least one non-transitory memory storing machine-readable instructions, that when executed with the at least one processor, cause the apparatus to:
receive, from a sensor module, first sensor data;
analyze the first sensor data to determine a first location of an entity;
based on determining that the first location satisfies a spatial boundary, determine a first type for a first augmented reality presentation of an avatar and a first intensity level for the first augmented reality presentation of the avatar;
cause output, based on the first type and the first intensity level, of the first augmented reality presentation of the avatar, wherein the first augmented reality presentation of the avatar indicates, to the entity, an instruction associated with the spatial boundary;
receive, from the sensor module, second sensor data;
analyze the second sensor data to determine a second location of the entity;
based on determining that the second location satisfies the spatial boundary and based on a time between the determining that the first location satisfies the spatial boundary and the determining that the second location satisfies the spatial boundary, determine a second type for a second augmented reality presentation of the avatar and a second intensity level for the second augmented reality presentation of the avatar, wherein the first type is different from the second type and the first intensity level is different from the second intensity level; and
cause output, based on the second type and the second intensity level, of the second augmented reality presentation of the avatar.

12. The apparatus of claim 11 wherein the first type or the second type comprises at least one of a visual presentation, an auditory presentation, an olfactory presentation, or a taste presentation.

13. The apparatus of claim 11 wherein the instruction indicates that the entity is to move to a location where the spatial boundary is not satisfied.

14. The apparatus of claim 11 wherein the first intensity level is based at least in part upon a level to which the first location satisfies the spatial boundary.

15. The apparatus of claim 11 wherein the entity is a non-human animal, wherein the avatar comprises a representation of a keeper of the non-human animal;
wherein the first augmented reality presentation of the avatar is output to a pair of goggles the non-human animal wears for display with the pair of goggles; and
wherein the second augmented reality presentation of the avatar is output to the pair of goggles for display with the pair of goggles.

16. The apparatus of claim 11 wherein the spatial boundary indicates a first area with locations allowable to the entity and a second area with locations not-allowable to the entity;
wherein the machine-readable instructions, when executed with the at least one processor, cause the apparatus to determine that the first location satisfies the spatial boundary based on the first location indicating that the entity is outside the first area, the first location indicating that the entity is inside the second area, or the first location indicating that the entity is crossing from the first area to the second area; and
wherein the machine-readable instructions, when executed with the at least one processor, cause the apparatus to determine that the second location satisfies the spatial boundary based on the second location indicating that the entity is outside the first area, the second location indicating that the entity is inside the second area, or the second location indicating that the entity is crossing from the first area to the second area.

17. The apparatus of claim 11 wherein the spatial boundary is defined based on a predetermined distance from at least one fixed location or at least one movable location.

18. The apparatus of claim 17 wherein the at least one fixed location or the at least one movable location is defined with a location of an object different from the entity, and wherein the machine-readable instructions, when executed with the at least one processor, cause the apparatus to:
configure the spatial boundary based on an audible command from a user different from the entity, wherein the audible command indicates the object.

19. At least one non-transitory computer readable medium storing instructions that, when executed, cause an apparatus to:
receive, from a sensor module, first sensor data;
analyze the first sensor data to determine a first location of an entity;
based on determining that the first location satisfies a spatial boundary, determine a first type for a first augmented reality presentation of an avatar and a first intensity level for the first augmented reality presentation of the avatar;
cause output, based on the first type and the first intensity level, of the first augmented reality presentation of the avatar, wherein the first augmented reality presentation of the avatar indicates, to the entity, an instruction associated with the spatial boundary;
receive, from the sensor module, second sensor data;
analyze the second sensor data to determine a second location of the entity;
based on determining that the second location satisfies the spatial boundary and based on a time between the determining that the first location satisfies the spatial boundary and the determining that the second location satisfies the spatial boundary, determine a second type for a second augmented reality presentation of the avatar and a second intensity level for the second augmented reality presentation of the avatar, wherein the first type is different from the second type and the first intensity level is different from the second intensity level; and cause output, based on the second type and the second intensity level, of the second augmented reality presentation of the avatar.

20. The at least one non-transitory computer readable medium of claim 19, wherein the first augmented reality presentation of the avatar indicates, to the entity, the instruction based on one or more first visually displayed gestures of the avatar and a first audible voice of the avatar, wherein the one or more first visually displayed gestures and the first audible voice of the avatar are based on the first intensity level; and wherein the second augmented reality presentation of the avatar indicates, to the entity, the instruction based on one or more second visually displayed gestures of the avatar and a second audible voice of the avatar, wherein the one or more second visually displayed gestures and the second audible voice of the avatar are based on the second intensity level, and wherein the second intensity level is greater than the first intensity level.

* * * * *